(12) United States Patent
Madden et al.

(10) Patent No.: US 11,995,999 B2
(45) Date of Patent: May 28, 2024

(54) DRONE FIRST RESPONDER ASSISTANCE

(71) Applicant: Alarm.com Incorporated, Tysons, VA (US)

(72) Inventors: Donald Gerard Madden, Columbia, MD (US); Babak Rezvani, St Petersburg, FL (US); Ahmad Seyfi, Reston, VA (US); Glenn Tournier, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 220 days.

(21) Appl. No.: 17/349,314

(22) Filed: Jun. 16, 2021

(65) Prior Publication Data

US 2021/0398434 A1 Dec. 23, 2021

Related U.S. Application Data

(60) Provisional application No. 63/040,141, filed on Jun. 17, 2020.

(51) Int. Cl.
*G08G 5/00* (2006.01)
*B64C 39/02* (2023.01)
*G08G 1/0955* (2006.01)

(52) U.S. Cl.
CPC ......... *G08G 5/0056* (2013.01); *B64C 39/024* (2013.01); *G08G 1/0955* (2013.01); *G08G 5/0069* (2013.01)

(58) Field of Classification Search
None
See application file for complete search history.

(56) References Cited

U.S. PATENT DOCUMENTS

| | | |
|---|---|---|
| 7,683,793 B2 | 3/2010 | Li et al. |
| 9,980,112 B1 | 5/2018 | Newby et al. |
| 10,514,264 B2 | 12/2019 | Correnti et al. |
| 11,143,521 B2 | 10/2021 | Correnti et al. |
| 2005/0190053 A1 | 9/2005 | Dione |
| 2008/0062167 A1 | 3/2008 | Boggs et al. |
| 2011/0163872 A1 | 7/2011 | Pasveer et al. |
| 2011/0195687 A1 | 8/2011 | Das et al. |
| 2011/0276264 A1 | 11/2011 | Plocher et al. |
| 2013/0169817 A1 | 7/2013 | Jones et al. |
| 2016/0049064 A1 | 2/2016 | McNabb et al. |
| 2017/0032632 A1 | 2/2017 | Joseph et al. |
| 2018/0075759 A1* | 3/2018 | Kim ................. G08G 1/096827 |
| 2018/0158315 A1 | 6/2018 | Sloo et al. |
| 2018/0204428 A1 | 7/2018 | Asaro et al. |
| 2018/0286228 A1* | 10/2018 | Xu ........................ G08G 1/0145 |
| 2018/0356241 A1 | 12/2018 | Correnti et al. |
| 2019/0051169 A1* | 2/2019 | Gomez Gutierrez .. G08G 1/087 |
| 2020/0240802 A1 | 7/2020 | Correnti et al. |

(Continued)

*Primary Examiner* — Adam D Tissot
*Assistant Examiner* — Charles Pall
(74) *Attorney, Agent, or Firm* — Fish & Richardson P.C.

(57) ABSTRACT

Methods, systems, and apparatus, including computer programs encoded on computer-storage media, for receiving a request to deploy an aerial drone to assist an emergency vehicle from a first location to a second location; determining a route to be traversed by the emergency vehicle from the first location to the second location based on the request; and deploying the aerial drone to traverse the route in advance of the emergency vehicle.

20 Claims, 4 Drawing Sheets

(56) References Cited

U.S. PATENT DOCUMENTS

| | | |
|---|---|---|
| 2021/0261247 A1* | 8/2021 | Rajan Kesavelu Shekar ............. H04W 4/40 |
| 2022/0076555 A1 | 3/2022 | Menard et al. |
| 2022/0194581 A1* | 6/2022 | Culver ................. H04W 4/029 |

* cited by examiner

DRONE FIRST RESPONDER ASSISTANCE

CROSS-REFERENCE TO RELATED APPLICATION

This application claims the benefit of U.S. Provisional Application No. 63/040,141, filed on Jun. 17, 2020, the contents of which are incorporated by reference herein in its entirety.

BACKGROUND

Many properties are equipped with monitoring systems that include sensors and connected system components.

SUMMARY

Techniques are described for drone assistance. According to one implementation, first responders may use drones to collect data in order to aid in an emergency response. One or more drones may also be used to help first responders navigate to a scene of an emergency or other situation.

In some implementations, one or more drones are used to search on a property and provide data or to provide guidance to first responders. For example, drones or other automated devices of a property can be used to track one or more elements of the property, including residents, such that, in an emergency situation, the locations of the one or more elements of the property, including residents, can be provided to first responders. This is advantageous especially in scenarios where search and rescue operations are being considered. Information regarding the location of residents at a property or whether or not residents are at a property, can inform subsequent activities by first responders.

In some implementations, one or more drones direct first responders to a resident within a property. For example, data related to the location of a particular resident within a property can be used by a drone to accompany a first responder into the property. The drone can help pinpoint and aid in the rescue of the particular resident.

In some implementations, one or more drones provide guidance or traffic assistance. For example, one or more drones can fly ahead of a police car to alert cars on the road that a police car is coming and to move to the side of the road. One or more drones can be used to affect traffic. For example, a drone can be used as a traffic signal or red-light, stopping one or more cars and allowing an unobstructed path for one or more first responders to a particular property related to an emergency situation.

In some implementations, one or more drones are used for reconnaissance. For example, elements like fire hydrants can be spotted by a drone to help aid in the response of firefighters. A drone can go ahead of firefighters and illuminate elements, or otherwise make them readily visible, in order to facilitate efficient response when the first responders arrive.

In some implementations, other items may be highlighted by a drone. For example, in addition to a fire hydrant, fire department connections (FDC) on buildings, emergency key access boxes, alternative entrances to a building, among others may be highlighted by a drone. In some cases, a drone may highlight the location of an item by directing light on the item, sending a communication to a user of the drone indicating the location of an item after finding the item, or otherwise indicating the location of an item to personnel. In some cases, a drone may use a global position system (GPS), property plan details, or pre-incident survey data, such as data collected before a current emergency scenario, that indicates where one or more items are on the property. A drone may then be used to confirm or direct emergency personnel to the location of the item or to directly interact with the item. For example, a drone may retrieve a key box and return it to emergency personnel to allow personnel to access the key. A drone may be used to open a fire hydrant or perform other tasks. In general, a drone may interact with any found item as personnel would if personnel were able to interact with it. In this way, a drone may enable interaction with items even if the item is compromised (e.g., within a threshold of a fire, gas leak, or other dangerous incident).

In some implementations, one or more drones are used for hazards and scene assessment. For example, a drone can use visual sensors or other forms of sensors to detect elements of an emergency situation. The drone can then alert first responders of the particular hazards or other details of the scene before the first responders arrive. Data collection and dissemination to first responders may continue even after first responders arrive especially in situations where the view from an aerial drone is desired.

In some implementations, one or more drones are used to set up and maintain an exclusion zone around an emergency situation or other alarm. For example, a chemical spill on a road way may have fumes and debris related to a car crash on the scene. The one or more drones on the scene can gather data and determine an appropriate exclusion zone, or recommend an appropriate exclusion zone to first responders and alert first responders if any unauthorized entity enters. The one or more drones may also directly enforce the exclusion zone with speakers, lights or other indicators of danger.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
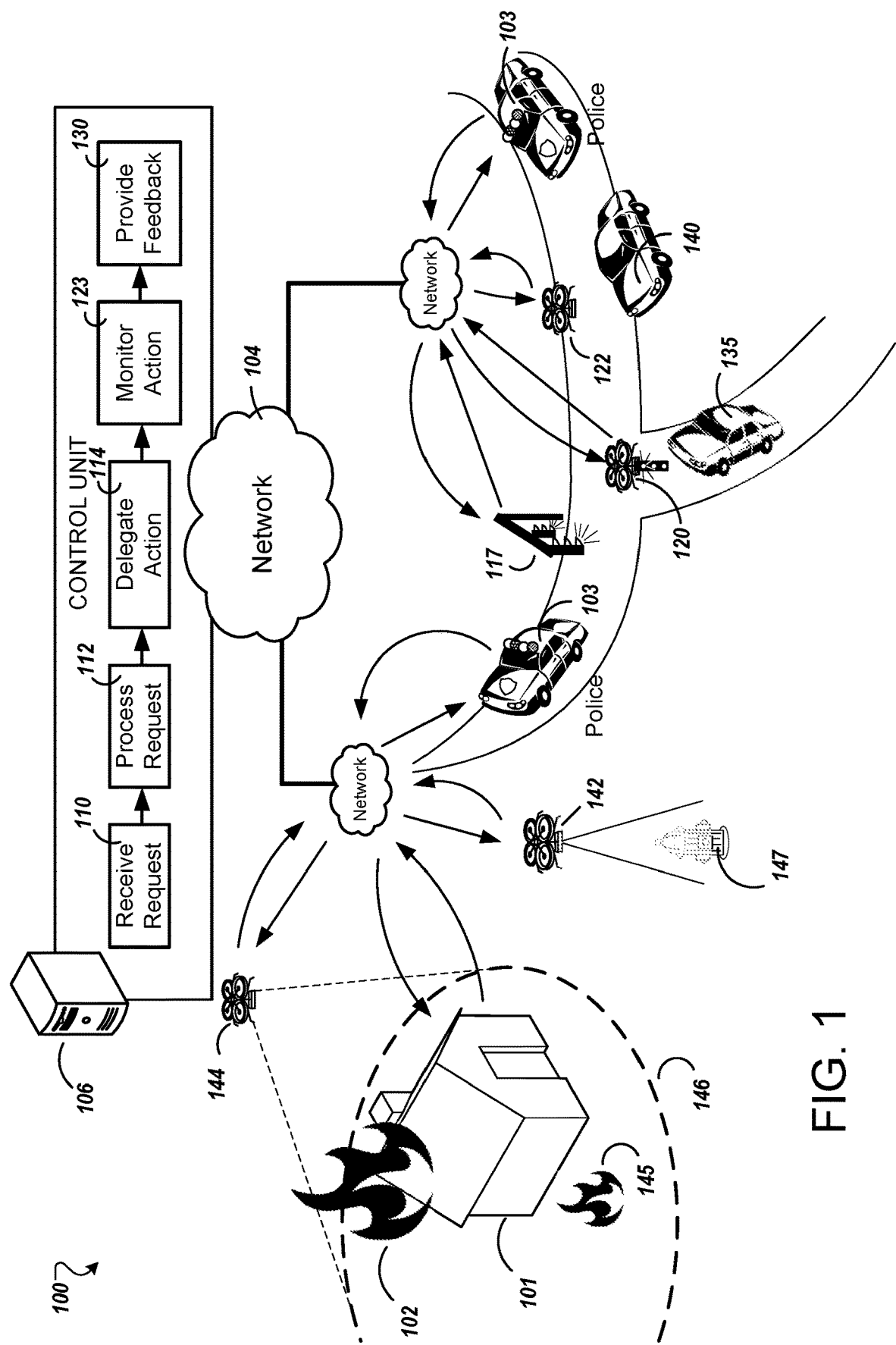
FIG. 1 is a diagram showing an example of a system for drone first responder assistance.

FIG. 1 is a diagram showing an example of a system 100 for drone first responder assistance. The system 100 includes a property 101, a fire 102, a police car 103, a network 104, a control unit 106, a first traffic signal 117, a first drone 120, a second drone 122, a first car 135, a second car 140, a third drone 142, a fire hydrant 147, and a fourth drone 144.

The property 101 is on fire as shown by the fire 102. First responders in the form of the police car 103 are called to the scene by monitoring systems, including fire detectors, located on the property 101. In some cases, a call placed to a first responder can prompt similar first responder action.

The police car 103 navigates to the property 101 on public roadways with the first traffic signal 117 as well as other cars such as the first car 135 and the second car 140. The first drone 120 and the second drone 122 in the system 100 are used to help the police car 103 navigate safely and efficiently to the property 101.

The police car 103 sends a signal to the network 104 that is a form of a request for drone assistance. The network is connected to the control unit 106 that interprets and processes this request.

The network 104 may be configured to enable exchange of electronic communications between the control unit 106 and the one or more elements of the system 100 including the police car 103, the first drone 120, the second drone 122, the third drone 142, and the fourth drone 144. The network 116 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data.

The request from the police car 103 is received by the control unit 106 in a receive request component 110 of the control unit 106. Elements of the receive request component 110 of the control unit 106 include preparing the data sent from the police car 103 to the control unit 106 for additional processing. For example, the data received from the police car 103 in FIG. 1 contains data indicating a request to clear the roadways in a path to the property 101.

The control unit 106 processes the request in a process request component 112 of the control unit 106. Elements of the process request component 112 include determining available elements of the system 100 (i.e., drones, connected components, monitoring system elements, etc.) and actions, based on available elements that, when performed, satisfy the received request. In the example of FIG. 1 corresponding to the intersection with the first traffic signal 117, the actions include clearing the roadway in front of the police car 103 and controlling traffic flow.

The control unit 106 delegates action in a delegate action component 114 by sending data over the network 104 to the first traffic signal 117, first drone 120, and the second drone 122. The first traffic signal 117 is to perform the action of activating a green light for the police car 103 to move through the intersection. The first drone 120 is to perform the action of adding a traffic signal to the intersection in order to stop the first car 135. The second drone 122 is to perform the action of alerting the second car 140 and indicating to the second car 140 that it should make way for the police car 103.

The first traffic signal 117 receives a signal from the control unit 106 that includes information used to change the light activated in the first traffic signal 117. The first traffic signal 117 changes from red to green allowing the police car 103 to move through the intersection.

In some implementations, the first drone 120 receives signals from local devices. For example, the first drone 120 can receive signals from an emergency vehicle as it approaches an intersection. The first drone 120 can, in response to receiving a signal from the emergency vehicle, perform relevant actions. In some cases, the signal includes instructions for the first drone 120. For example, the first drone 120 can receive instructions from the emergency vehicle to stop all traffic and give right of way to the emergency vehicle.

In some implementations, the first drone 120 uses locally captured data to perform operations. For example, the first drone 120 can capture one or more images of a vehicle approaching an intersection or exiting an intersection. In response to detecting the vehicle approaching the intersection, the first drone 120 can change one or more lights to give right of way to the vehicle. In response to detecting the vehicle exiting the intersection, the first drone 120 can perform relevant actions based on characteristics of the vehicle exiting the intersection. For example, if the vehicle turns east, the first drone 120 can preemptively move to a next intersection to the east of a current location of the vehicle. In this way, the first drone 120 can perform subsequent actions at the next intersection. Similarly, the first drone 120 can detect the vehicle and send updates to one or more other drones or other autonomous vehicles to perform subsequent actions.

In some implementations, the second drone 122 transmits a preemptive signal based on an approaching vehicle. For example, the second drone 122 can send a signal to a traffic light to change preemptively based on a vehicle approaching an intersection. In some cases, the second drone 122 can travel in front of the vehicle to change the lights preemptively. In some cases, the second drone 122 can perform actions that a vehicle may not be able to perform. For example, the second drone 122 can change traffic lights at an intersection for a vehicle that does not have an ability to change the traffic lights at the intersection.

In some implementations, the first drone 120 performs relevant actions for unplanned events detected locally. For example, the first drone 120 may detect the police car 103 coming from the direction of the first car 135. In this case, the first drone 120 can detect the police car 103 and, based on a known emergency location, change the signals for other cars at the intersection to give the police car 103 right of way through the intersection. In this case, the first drone could send a signal to the first traffic signal 117 to display a red light to stop traffic from interfering with the police car 103.

The first drone 120 is equipped with a light that resembles a standard traffic signal of the first traffic signal 117. By activating the light, the first drone 120 is able to stop the first car 135, and any other car that may proceed on the same road as the first car 135. This method may be especially advantageous in situations, like FIG. 1, where the area occupied by the first drone 120 does not have a traffic signal. This method may also be advantageous in situations where the traffic signals are not connected to a system or a user of the system 100 is not recognized by traffic signals and therefore cannot control them.

In some cases, the first drone 120 is equipped with another object that is used to control the traffic flow on a roadway. For example, the first drone 120 can use a single red light to function as the red in a traditional traffic signal. The first drone 120 can similarly be equipped with a standard looking stop sign that is shown to one or more cars to affect the traffic flow of the roadway. Any object that is used to control the traffic flow on a roadway can alternately stop a car from moving or allow a car to move or keep moving.

The second drone 122 performs the action of alerting the second car 140 and indicating to the second car 140 that it should make way for the police car 103. The second drone 122 uses an onboard speaker to alert the second car 140 and its driver that the police car 103 is approaching. The second drone 122 also uses visual cues, including lights to show where the second car 140 should proceed to in order to make way for the police car 103. In this case, the second car 140 makes way by pulling off to the side of the road allowing the police car 103 to pass.

In some implementations, the second drone 122 uses other methods or devices to alert or indicate to the second car 140. For example, in the case of the second car 140 being an autonomous driving vehicle, the second drone 122 may send one or more electronic signals to the one or more computers controlling the second car 140. The electronic signals may contain data that, when interpreted by the one or more computers controlling the second car 140, result in the second car 140 pulling to the side of the road to allow the police car 103 to pass or similar motion related to making an unobstructed path for the police car 103.

One or more of the first traffic signal 117, the first drone 120, or the second drone 122 communicate with the control unit 106 after receiving one or more assigned actions in a monitor action component 123.

The monitor action component 123 includes receiving data from the first traffic signal 117 that the light has been changed from red to green. Depending on factors such as the speed of the police car 103 and the distance between the police car 103 and the first traffic signal 117, the first traffic signal 117 controls the switch from red light to green light. The first traffic signal 117 also includes a recommended time interval to be displaying the green light before the police car 103 arrives. In general, time intervals can be used to make sure that the intersection is clear before a first responder vehicle enters an intersection.

The monitor action component 123 includes receiving data from the first drone 120. The data includes visual images captured by one or more cameras on board the first drone 120, the current light activation of the light element carried by the first drone 120, and other data (i.e., current location, battery level, etc.). The visual images are sent to the control unit 106 to be processed. Based on visual analysis performed by the control unit 106 on the received visual images, the control unit 106 determines that a car, the first car 135, is in view. By comparing a sequence of images, the control unit 106 determines that the first car 135 is not moving and has stopped. Furthermore, based on the current light activation of the light element carried by the first drone 120 and other data, the control unit 106 determines the first drone 120 successfully activated the red light indicator, the current battery level is nominal, and the location matches the location of the intersection corresponding to the first traffic signal 117.

In some implementations, the first drone 120 processes visual images locally. A determination based on the locally processed images is sent to the control unit 106 as part of the monitor action component 123.

The monitor action component 123 includes receiving data from the second drone 122. The data includes visual images captured by one or more cameras on board the second drone 122 and other data (i.e., current location, battery level, etc.). The visual images are sent to the control unit 106 to be processed. Based on visual analysis performed by the control unit 106 on the received visual images, the control unit 106 determines that a car, the second car 140, is in view. By comparing a sequence of images, the control unit 106 determines that the second car 140 has pulled to the side of the road. Furthermore, based on other data, the control unit 106 determines the current battery level of the second drone 122 is nominal, and the location matches the location of roadway currently in front of the police car 103.

In some implementations, the second drone 122 processes visual images locally. A determination based on the locally processed images is sent to the control unit 106 as part of the monitor action component 123. In the case where the second car 140 is autonomously driven, the second drone 122 provides data indicating a transaction of data between the second drone 122 and the one or more computers controlling autonomous driving of the second car 140.

The control unit 106 provides feedback to the police car 103 in response to request of the police car 103 and the actions performed by one or more elements of the system 100 in a provide feedback component 130. The feedback data includes information regarding the first traffic signal successfully activating the green signal allowing the police car 103 to move through the intersection, the first drone 120 successfully deploying an ad hoc traffic signal to successfully stop the first car 135, and second drone 122 successfully instructing the second car 140 to the side of the road to make a way for the police car 103.

In some implementations, the police car 103 submits the request for drone assistance a mile or more away from the intersection corresponding to the first traffic signal 117. The control unit 106 uses the location of the police car 103 and the location of various other elements in the request in order to perform actions relevant to the request. In some cases, the police car 103 sends multiple requests to the control unit 106 and the control unit 106 handles each request to enable to the police car to navigate freely to the property 101. For example, the police car 103 is called to another property. The path from the current location of the police car 103 and the other property has three intersections. The police car 103 can submit requests detailing drone assistance to the other property which results in help being deployed sequentially at each of the three intersections. In some cases, drones may be used for more than one use. For example, it may be advantageous to use the second drone 122 again, in another part of the road, to alert another car to move to the side of the road and make way for the police car 103.

In some implementations, if multiple emergency vehicles are in the vicinity of one another, the one or more drones involved can control traffic or alert appropriate personnel to avoid any collisions or obstructions. For example, if the first car 135 in FIG. 1 was an emergency vehicle, the first drone 120 may be used to stop and then allow the first car 135 to proceed on its route ahead of any other normal cars. A hierarchy of emergency vehicles or situations may be used to determine which vehicle should yield to another vehicle in cases where a vehicle must yield to another or a particular route is to be used for one vehicle and not another.

The police car 103 successfully navigates to the property 101. The police car 103 submits an additional request to the control unit 106 requesting drone assistance at the property 101.

The additional request is sent over the network 104. The control unit 106 receives the request in the receive request component 110 of the control unit 106. Elements of the receive request component 110 of the control unit 106 include preparing the data sent from the police car 103 to the control unit 106 for additional processing. For example, the data received from the police car 103 in FIG. 1 contains data indicating a request to perform property reconnaissance on the property 101, collect data from the property 101 and components connected on the property 101, and perform hazard and scene assessment on the property 101.

The control unit 106 processes the additional request in a process request component 112 of the control unit 106. Elements of the process request component 112 include determining available elements of the system 100 (i.e., drones, connected components, monitoring system elements, etc.) and actions, based on available elements that, when performed, satisfy the received additional request. In the example of FIG. 1, the actions include performing property reconnaissance on the property 101, collecting data from the property 101 and components connected on the property 101, and performing hazard and scene assessment on the property 101.

The control unit 106 delegates action in a delegate action component 114 by sending data over the network 104 to the third drone 142, the property 101, and the fourth drone 144. The third drone 142 is to perform the action of reconnaissance on the property 101. The property 101 is to perform, together with connected components including monitoring systems installed, the action of collecting data from the property 101. The fourth drone 144 is to perform the action of hazard and scene assessment on the property 101.

The third drone 142 receives a signal from the control unit 106 that includes information used to start reconnaissance on the property 101. The information includes the fact that the property 101 is on fire and flames, including 102 and 145, need to be put out. The information includes objects of importance that should be found such as possible sources of water that are nearby. The third drone 142, using the information, performs reconnaissance on the property 101 and in the vicinity of the property 101. The third drone 142 finds the nearest fire hydrant, the fire hydrant 147, a water source that will be important in putting out the fire at the property 101.

The property 101 receives a signal from the control unit 106 to send data related to the property 101. In the example of FIG. 1, the property 101 uses additional elements, including internal drones, to investigate the property 101 and persons on, or the vicinity to, the property 101.

In some implementations, the property 101 or computer systems interfacing with elements of the property 101 such as a monitoring system, control one or more drones pre-installed on the property 101 or one or more drones deployed by one or more first responders. For example, the property 101 may have drones stationed and/or first responders indicated by the police car 103 may deploy additional drones.

In some implementations, drones from nearby properties may be used in emergency situations by first responders or other users. For example, if a forest fire broke out near the property 101 and if one or more drones were stationed at the property 101, the drones stationed at the property 101 could be used to help fight the forest fire that broke out near the property 101. The one or more drones may be used, in some cases, when the fire is not directly on the property 101.

In some implementations, one or more drones at the property 101 or within the property 101, communicate with the control unit 106. The one or more drones gather information from the control unit 106 related to the alarm condition and the current or last-known locations of one or more persons in or at the property 101. The one or more drones search for missing people using data about the property (i.e., three dimensional model representation, two dimensional models, vector maps, etc.), live and recorded data from one or more sensors in the monitoring system of the property 101, and information about the occupants and their mobility. The one or more drones stream video and notifications to first responders, including responders associated with the police car 103, or lead the first responders into the property 101—either to the source of the alarm, such as a fire detector in the example of FIG. 1, or the likely locations of the one or more persons at the property.

In some implementations, one or more drones lead first responders to specific elements related to the alarm or request of a first responder. For example, one or more drones on the property 101 may lead firefighters on the most direct route to the alarming smoke detector or to the inferred location of a resident based on motion sensors or the topology of the home.

The fourth drone 144 receives a signal from the control unit 106 that includes information used to perform the action of hazard and scene assessment on the property 101. The fourth drone 144 uses onboard sensors including cameras to locate the property 101 as well as fire 102 and 145. By capturing multiple elements of the alarm condition and the situation at the property 101, the fourth drone 144 establishes an exclusion zone 146. Aspects of the exclusion zone 146 are informed by the control unit 106. For example, the fourth drone 144 receives data related to the wind direction in the vicinity of the property 101 or uses onboard sensors to detect wind. In the case of the fire 102 and 145 in FIG. 2, the direction of the wind can be used to include downwind section of lands in any exclusion zone as downwind sections of land have a greater potential of catching fire. The process of hazard and scene assessment is discussed also in reference to FIG. 2.

One or more of the third drone 142, the property 101 or connected systems, or the fourth drone 144 communicate with the control unit 106 after receiving one or more assigned actions in a monitor action component 123.

The monitor action component 123 includes receiving data from the third drone 142 that includes one or more visual images. The one or more visual images are processed by the control unit 106 to determine that the third drone 142 has found the fire hydrant 147. The third drone 142 receives a signal from the control unit 106 that the one or more visual images captured at a particular location represent the fire hydrant 147. The third drone 142 uses illuminators on board to illuminate the location corresponding to the fire hydrant 147. The illumination of the fire hydrant 147 is especially advantageous in situations of low visibility such as fog or at night.

In some implementations, the location of the fire hydrant 147 is known. For example, the location of the fire hydrant 147 can be associated with coordinates based on global positioning or other localizing system. Similarly, the fire hydrant 147 can be associated with a proximity to one or more other features on or near the property 101. The third drone 142 can emphasize the location of the fire hydrant 147. For example, the third drone 142 can detect low levels of light in the vicinity of the fire hydrant 147. In response, the third drone 142 can activate lights to illuminate the fire hydrant 147. In another example, the third drone 142 can detect that the fire hydrant 147 is visually obscured by surrounding elements. The third drone 142 can remove or move the obscuring elements. Alternatively, the third drone 142 can use the light or other equipped device to indicate a location of the fire hydrant 147 that may be visually obscured. In some cases, other autonomous devices or personnel at or near the property 101 can remove the visual obscurity.

In some implementations, the third drone 142 processes visual images locally. A determination based on the locally processed images is sent to the control unit 106 as part of the monitor action component 123.

The monitor action component 123 includes receiving data from the property 101 or connected systems that includes data related to the property 101 and the alarm or situation shown in FIG. 1. The control unit 106 receives information related to the area of the fire and whether or not any persons were at the property 101 at the time of the fire. The control unit 106 receives information from monitoring system elements and/or drones within the property 101. The control unit 106 determines based on the received information that no persons were at the property 101 at the time of the fire.

The monitor action component 123 includes receiving data from the fourth drone 144 that includes one or more visual images. The one or more visual images are processed by the control unit 106. The control unit 106 determines based on one or more elements in the one or more visual images (i.e., the fire 102 and 145, the property 101, the wind direction discussed above, etc.) that the exclusion zone 146 is appropriate for the situation. The fourth drone 144 receives a signal from the control unit 106 that a specific region related to the property 101 is to be the exclusion zone 146. The fourth drone 144 uses elements on board such as speakers and lights to make sure that persons, things, and other possibly hazardous elements such as explosives or other dangerous materials, do not enter or are removed from the exclusion threshold. The fourth drone 144 communicates with the control unit 106 to maintain the exclusion threshold and to call for assistance if assistance is needed.

In some implementations, the fourth drone 144 processes visual images locally. A determination based on the locally processed images is sent to the control unit 106 as part of the monitor action component 123.

The control unit 106 provides feedback to the police car 103 in response to the additional request of the police car 103 and the actions performed by one or more elements of the system 100 in a provide feedback component 130. The feedback data includes information regarding the third drone 142 performing reconnaissance and successfully locating the fire hydrant 147 nearest to the property 101, the property 101 performing, together with connected components including monitoring systems installed, the action of collecting data from the property 101 resulting in the determination that no persons are within the property 101, and the fourth drone 144 performing the action of hazard and scene assessment on the property 101 resulting in the exclusion zone 146 determined by visual processing and other information (i.e., wind direction, etc.).

The first responders associated with the police car 103 and the additional request made to the system 100, use the assistance of the drones 142 and 144 together with the connected systems monitoring the property 101 to aid in the response to the fire at the property 101. Data related to the drone assistance as well as further assistance is made available to subsequent first responders such as firefighters. The drones 142 and 144 may be reassigned or maintain current roles. Specific additional data from the property 101 may be obtained from one or more connected systems related to the property 101.

In some implementations, other forms of first responders are involved in the system 100. For example, FIG. 1 shows the police car 103 that represents any first responder. Instead of the police car 103, an ambulance, fire engine, private security firm, etc. can submit requests to the control unit 106.

In some implementations, the request for assistance in navigating to the property 101 and assistance at the property 101 is a singular request and the control unit 106 organizes dispatching and timing of elements of the system 100. For example, the police car 103 or another element of the system 100 sends a request to the control unit 106 for drone assistance related to a fire at the property 101. The control unit 106 can use data such as the location of the property 101, navigation routes of first responders to the property 101, connected elements available at the property 101, along the route to the property 101, and in the vicinity of the property 101 to organize assistance.

In some implementations, drone assistance is automatically dispatched based on emergency need. For example, a car crash detected on a road way can automatically invoke one or more elements of the system 100 to assist first responders. The automatic dispatching of one or more elements can be accompanied by further direct requests made by users or first responders for specific actions to be taken by a drone or another element of the system 100.

Figure 2:
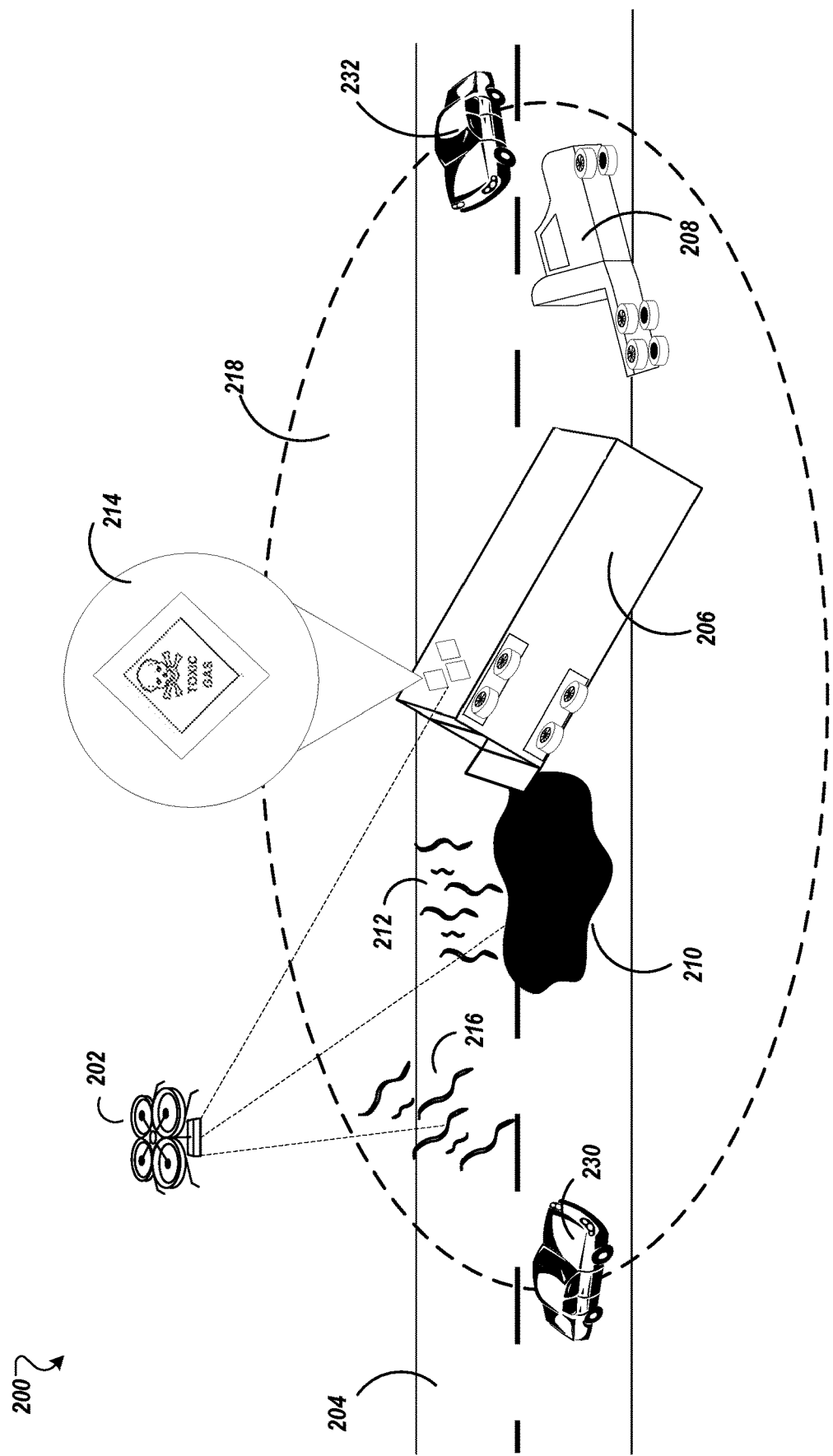
FIG. 2 is a diagram showing an example of a drone detecting a hazard.

FIG. 2 is a diagram showing an example of a drone detecting a hazard.

FIG. 2 shows a system 200 that includes a drone 202, a roadway 204, a truck container 206, a truck 208, a spill 210, initial fumes 212, a toxic gas label 214, secondary fumes 216, an exclusion zone 218, a first car 230, and a second car 232.

The drone 202 is dispatched to the area shown in FIG. 2. The drone 202 is given information by a control unit similar to the control unit 106 of FIG. 1. The information includes a location of the crash involving the truck 208 and the truck container 206 on the roadway 204. The drone 202 uses the location to navigate to the crash before first responders arrive. The drone 202 is assigned the action of establishing an exclusion zone.

The drone 202 captures one or more visual images of the crash scene. The drone 202 either processes the one or more visual images of the crash scene on board or sends the one or more images to an external entity to be processed, depending on implementation. The drone 202 determines that the crash involving the truck 208 has resulted in the spill 210 coming from the truck container 206.

The drone 202 uses further visual processing to read the toxic gas label 214 on the truck container 206. The toxic gas label 214 informs the drone 202 the likely nature of the spill 210. The drone 202 detects the initial fumes 212 and determines based on the likely toxic nature of the spill 210 that the initial fumes 212 are toxic.

The drone 202 uses devices on board to detect other elements relevant to the situation. In the example shown in FIG. 1, the drone 202 detects the initial fumes 212 and based on a calculated wind speed and direction determines the secondary fumes 216. In some implementations, wind speed and direction can be determined by another element and sent to the drone 202. For example, a control unit may have weather data of a region and pass relevant data to the drone 202. In other implementations, the control unit receives the location of the initial fumes 212 and computes the location of the secondary fumes 216. Data representing the location of the secondary fumes 216 is sent to the drone 202. In other implementations, the drone 202 directly observes, with visual sensors, chemically sensitive sensors, or another type of sensor, a particular danger. For example, the drone 202 may use visual sensors to detect the secondary fumes 216 and direct locate them based on the visual data from the visual sensors.

The drone 202, based on the elements of the crash including the truck 208, the truck container 206, and the spill 210, the initial fumes 212, the toxic gas label 214, the secondary fumes 216, and other computed or obtained information (i.e., wind speed direction/speed, etc.), determines the exclusion zone 218.

In some implementations, the exclusion zone 218 is determined by a control unit associated with the drone 202. For example, the drone 202, or one or more other elements not shown, provides data to the control unit. The control unit determines the region for the exclusion zone 218 and sends information corresponding to the exclusion zone 218 region to the drone 202.

In some implementations, the drone 202 automatically identifies hazardous materials and other dangers ahead of the first responders. For example, the drone 202 may automatically identify hazmat labels and placards, estimate the size of a container or spill, look up the material in National Institute for Occupational Safety and Health (NIOSH) or the Department of Transportation (DOT) guides. The drone 202 may then relay this information to first responders, along with recommended exclusion zones based on the observed wind patterns or weather.

In some implementations, the data obtained by the drone 202 is placed on a map or other interface. For example, data related to the crash and subsequent toxic gas spill 210 can be set on a generated map and be used for planning a strategy of containment by first responders.

The drone 202 sends information related to the crash of the truck 208 and the spill 210 to first responders. The first responders use this information to organize safety measures and arrange necessary clean-up.

The drone 202 monitors the exclusion zone 218. The drone 202 observes the first car 230 coming into the exclusion zone 218. Depending on implementation, the drone 202 either warns the encroaching party or alerts first responders. For example, the drone 202 can warn the first car 230 indicating that a toxic spill 210 is ahead and that the first car 230 must move back to beyond the threshold of the exclusion zone 218. The drone 202 can use speakers, lights, or other elements on board to warn or otherwise indicate the situation and necessary actions to the first car 230. For another example, the drone 202 can alert first responders that the first car 230 is within the exclusion threshold. In some cases, the first car 230 may have a role in the clean-up effort or investigation in which case, first responders or another entity receiving the alert can respond to the drone 202 that no action needs to be taken, that the first car 230 is allowed in the exclusion zone 218. In some implementations, the drone 202 alerts both the first car 230 and the first responders.

In some implementations, the drone 202 navigates on the roadway 204 to perform actions subsequent to a hazard detection. For example, the drone 202 can move up the roadway 204 against the direction of traffic and close the lane in advance of the hazard or accident. In some cases, the drone 202 can perform actions automatically based on the detection of the hazard or can receive a signal from emergency personnel to perform relevant actions including closing lanes of oncoming traffic.

In some implementations, two or more drones work together. For example, the drone 202 can, together with one or more other drones, help to close a lane of traffic or create a perimeter. For example, the two or more drones can act as flares to direct traffic. The two or more drones can encircle an accident site and prevent unwanted or unauthorized access. Access attempts associated with unauthorized persons can prompt a warning action by the one or more drones, a preventative action, or signal sent to emergency personnel or person of authority.

In some implementations, the drone 202 provides an interface for the first car 230 to communicate with first responders. For example, the drone 202 can use speakers and microphones on board to allow the first car 230 to ask questions about the accident or provide alternate route information if a crash or other situation is blocking a pathway. The response to questions can either be automated with speech processing or addressed directly by a human.

The drone 202 also detects the second car 232 in the exclusion zone 218. The drone 202, depending on implementation can fly over and alert the second car 232 or first responders or, if the distance of the exclusion threshold is large, the drone 202 can communicate with other drones in the vicinity to check whether another drone is available to provide the alert to the second car 232. In general, one or more elements of a system (i.e., drones, sensors, automated systems, etc.) can communicate with one another either directly or through a control unit to cover multiple aspects of a particular situation or emergency.

Figure 3:
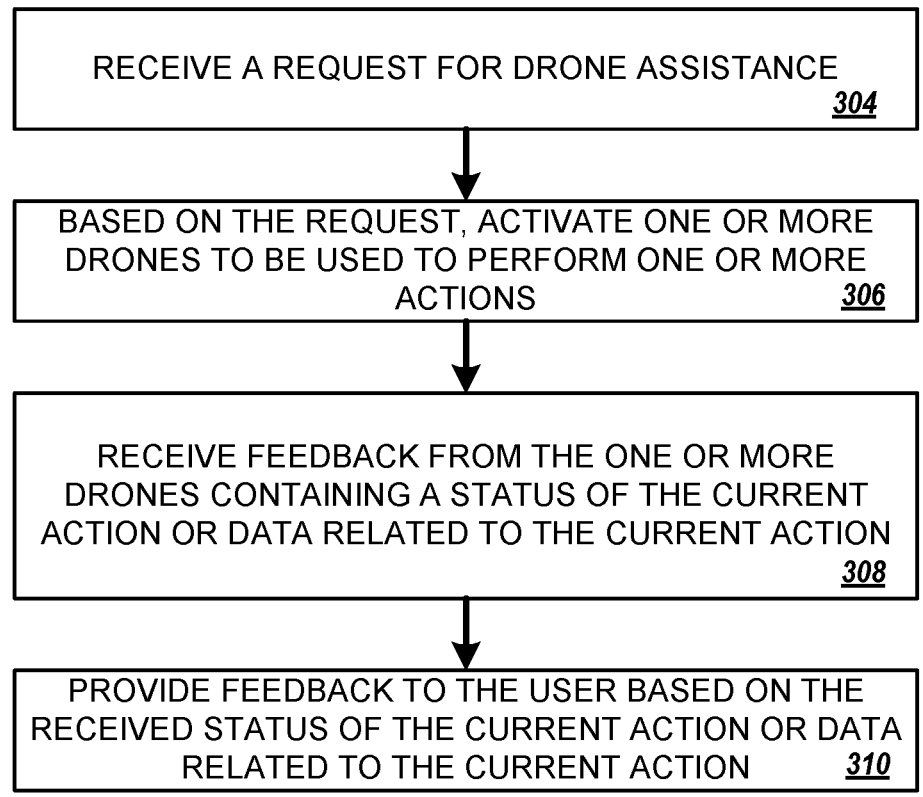
FIG. 3 is a flow diagram illustrating an example of a process for a drone first responder assistance system.

FIG. 3 is a flow diagram illustrating a process 300 for a drone assistance system. The process 300 is performed by one or more electronic devices or computers such as the system 100 of FIG. 1.

The process 300 includes receiving a request for drone assistance (304). For example, the police car 103 sends a request for traffic assistance to the control unit 106. The control unit 106 receives the request.

In some implementations, the process 300 may include receiving a request to deploy an aerial drone to assist an emergency vehicle from a first location to a second location. For example, the second drone 122 can be deployed to travel in front of the police car 103. In some cases, this may enable the second drone 122 to change the lights preemptively or prevent obstructions from blocking the route of the police car 103.

In some implementations, an emergency vehicle may include any vehicle used in an emergency response situation, such as vehicles for law enforcement, firefighting, medical emergencies, or other emergencies. For example, an emergency vehicle may include a police car, a firetruck, an ambulance, a police bicycle, a motorcycle, a drone, a van, or any other form of transportation used, or controlled, by emergency personnel in responding to an emergency situation.

In some implementations, a request is automatically generated based on a given situation or emergency. For example, an armed monitoring system, upon detecting a robbery, can signal a request for drone assistance and emergency response. In some cases, emergency response automatically includes drone assistance. For example, in a situation where emergency first responders are required, drones may be deployed to assist.

The process 300 includes activating one or more drones based on the request (306). For example, the control unit 106 uses the delegate action component 114 to assign actions to the first traffic signal 117 to turn from red to green, to the first drone 120 to use on board traffic-signal-like elements to produce a stopping signal to stop the first car 135, to the second drone 122 to indicate and otherwise warn the second car 140 that the police car 103 is coming and to move to the side of the road.

In some implementations, the process 300 may include determining a route to be traversed by the emergency vehicle from the first location to the second location based on the request. For example, the request for drone assistance sent by the police car 103 to the network 104 and the control unit 106 may include data indicating a request to clear a route to the property 101 from some initial starting point, such as a police department, other emergency headquarters, current location of the emergency vehicle, or expected location of the emergency vehicle at a time in the future.

In some implementations, the process 300 may include deploying the aerial drone to traverse the route in advance of the emergency vehicle. For example, if the request for drone assistance sent by the police car 103 to the network 104 and the control unit 106 includes data indicating a request to clear a route to the property 101 from some initial starting point, the control unit 106 may deploy one or more drones, such as the first drone 120, the second drone 122, the third drone 142, or the fourth drone 144, to traverse the route from the initial starting point to the property 101 in advance of the police car 103.

In some implementations, deploying the aerial drone to traverse the route in advance of the emergency vehicle may include deploying the aerial drone to arrive at a third location along the route before the emergency vehicle. For example, the aerial drone, such as the first drone 120 or the second drone 122, among others, may arrive at the intersection with the first traffic signal 117 before the police car 103. After proceeding through the intersection, the police car 103 may be ahead of one or more deployed drones along the route but the deployed drones may proceed in advance of the police car 103 again to secure a subsequent intersection or aid in an emergency operation at the property 101.

In some implementations, the process 300 may include deploying the aerial drone as a drone traffic signal, wherein the aerial drone is configured with one or more indicators for signaling one or more cars to stop. For example, as shown in FIG. 1, the first drone 120 may use onboard traffic-signal-like elements to produce a stopping signal to stop the first car 135.

In some implementations, the process 300 may include identifying a traffic signal of an intersection along the route; deploying the aerial drone to the intersection; and triggering the aerial drone to transmit one or more signals configured to change a state of the traffic signal. For example, after determining a route between an initial starting point and the property 101, the control unit 106 may identify the intersection along the route where the first traffic signal 117 is directing traffic. The second drone 122 may send a signal to first traffic signal 117 to change a state of the first traffic signal 117 preemptively based on the police car 103 approaching the intersection. For example, the first traffic signal 117 may change from a red or stop state to a green or go state to give the police car 103 the right of way.

In some implementations, the one or more signals transmitted by the aerial drone may include one or more of: an infrared communication signal, an acoustic communication signal, or an electromagnetic signal.

In some implementations, the control unit 106 may send a signal to change a state of a traffic signal. For example, instead of a drone being deployed and triggered to transmit one or more signals configured to change a state of the traffic signal, the control unit 106 may send a signal directly to the first traffic signal 117 to perform the action of activating a green light for the police car 103 to move through the intersection.

In some implementations, a drone is used to perform an action. After the action is completed, the drone can then return to a previous action. For example, a drone may be monitoring a first house in a neighborhood when an emergency personnel requests the drone to circle another home that has caught fire. The drone can circle the other home to check for fire, smoke, or occupants. After circling the property, the drone can return to the first house or continue circling the property, depending on the request or system settings.

In some implementations, the drones to be activated are drones within a set distance from the particular incident. For example, all drones within a mile radius of the property 101 may be available to perform actions relevant to the fire 102 at the property 101.

In some implementations, the process 300 may include receiving feedback from the one or more drones containing a status of the current action or data related to the current action (308). For example, the control unit 106 receives visual data from the drones 120 and 122. The control unit 106 processes the visual data from the drones 120 and 122 to determine, in part, that the first car 135 and the second car 140 have stopped and moved to the side of the road, respectively.

In some implementations, based on determining the one or more signals configured to change the state of the traffic signal did not change the state of the traffic signal, the process 300 may include deploying the aerial drone as a drone traffic signal, wherein the aerial drone is configured with one or more indicators for signaling one or more cars to stop. For example, the control unit 106 may receive sensor data from the drones 120 and 122. The control unit 106 processes the sensor data from the drones 120 and 122 to determine, in part, that the state of the first traffic signal 117 has not been changed from a red or stop state to a green or go state. Based on this determination, the control unit 106 can deploy one or more drones as a drone traffic signal at the intersection to either stop one or more cars or to clear a right of way for the emergency vehicle.

In some implementations, a drone may be deployed as a drone traffic signal. For example, the control unit 106 may identify that an intersection along the route to the property 101 does not have a functioning traffic signal. There may be no traffic signal or they may be a non-functioning traffic signal. The control unit 106 may deploy an aerial drone, such as the first drone 120, as a drone traffic signal, wherein the aerial drone is configured with one or more indicators for signaling one or more cars to stop.

In some implementations, the one or more indicators include one or more of a colored light and a version of a road sign. For example, the first drone 120 may be equipped with a red light element that, when activated, illuminates red light similar to a red light on a traffic signal. In this way, the first drone 120 may stop one or more cars from entering an intersection. Similarly, the any of the drones in the system 100 may be equipped with another element to signal to a vehicle either stop or go instructions. For example, the first drone 120 may be equipped with a stop sign that may be revealed to cars in order to stop the car. The first drone 120 may be equipped with a sign indicating that a car proceed slowly. In general, any sign or indicator may be used in order to indicate a desired motion of one or more vehicles.

In some implementations, the process 300 may include providing feedback to the user based on the received status of the current action of data related to the current action (310). For example, the control unit 106 provides the police car 103 with information stating in some form that the first car 135 and the second car 140 are not obstructing the route to the property 101.

In some implementations, the process 300 may include receiving sensor data from the aerial drone and based on processing the sensor data, determining that an intersection along the route is free from obstacles. For example, using one or more sensors, including a visual sensor, the second drone 122 may obtain one or more visual images of a section of the route to the property 101, such as the intersection with the first traffic signal 117. The second drone 122 may send data, including the visual images to the control unit 106. The control unit 106 can determine that a car, the second car 140 has pulled to the side of the road. In some cases, the control unit 106 can compare a sequence of images to determine a change of position of the second car 140 and that the second car 140 has pulled to the side of the road.

In some implementations, the process 300 may include sending a signal to the emergency vehicle indicating that the intersection is free from obstacles. For example, the control unit 106 may provide the police car 103 with information indicating that the first car 135 and the second car 140 are not obstructing the route to the property 101 and the current route is free from obstacles. In this way, an emergency vehicle may traverse a route more efficiently as the status of a section of the route may be predetermined as clear allowing the emergency vehicle to travel at higher speeds with greater safety along the route to a target location, such as the property 101.

In some implementations, the process 300 may include deploying one or more drones to the second location to aid in an emergency. For example, the third drone 142 may be deployed to the property 101 to aid in the emergency operations of the fire on the property 101. In one instance, the third drone 142 may be deployed to identify and highlight key areas or objects on or near the property. For example, the third drone 142 may be deployed, in a fire emergency to identify and highlight, with onboard lights, the hydrant 147 to make it easier for emergency personnel to locate the hydrant 147 to be used in putting out the fire.

In some implementations, one or more drones may be used to communicate with one or more persons at a property. For example, a drone of the system 100 may be deployed at the property 101 to communicate with persons in a building of the property 101. The communication may help to indicate an evacuation route or indicate where the emergency personnel will be entering or providing assistance. For example, a drone may use a speaker, screen, or other onboard equipment to communicate a message from emergency personnel to persons at the property 101. The message may instruct the persons to go to a window to be rescued or proceed along another evacuation route depending on the situation or implementation.

Figure 4:
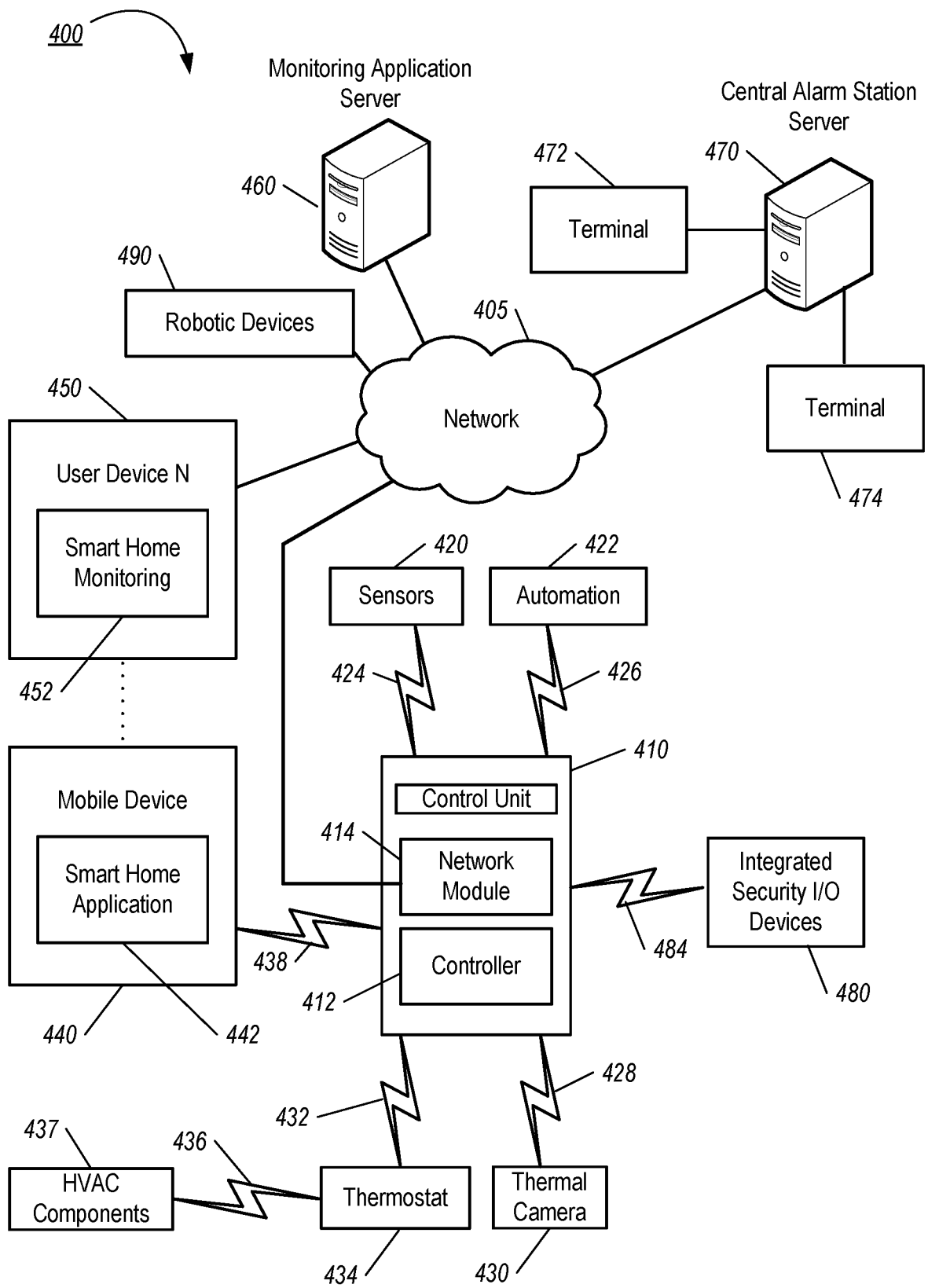
FIG. 4 is a diagram illustrating an example of a property monitoring system.

FIG. 4 is a diagram illustrating an example of a property monitoring system. The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors 420. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 420 can also include a radio-frequency identification (RFID) sensor that identifies a particular article that includes a pre-assigned RFID tag.

The system 400 also includes one or more thermal cameras 430 that communicate with the control unit 410. The thermal camera 430 may be an IR camera or other type of thermal sensing device configured to capture thermal images of a scene. For instance, the thermal camera 430 may be configured to capture thermal images of an area within a building or home monitored by the control unit 410. The thermal camera 430 may be configured to capture single, static thermal images of the area and also video thermal images of the area in which multiple thermal images of the area are captured at a relatively high frequency (e.g., thirty images per second). The thermal camera 430 may be controlled based on commands received from the control unit 410. In some implementations, the thermal camera 430 can be an IR camera that captures thermal images by sensing radiated power in one or more IR spectral bands, including NIR, SWIR, MWIR, and/or LWIR spectral bands.

The thermal camera 430 may be triggered by several different types of techniques. For instance, a Passive Infra-Red (PIR) motion sensor may be built into the thermal camera 430 and used to trigger the thermal camera 430 to capture one or more thermal images when motion is detected. The thermal camera 430 also may include a microwave motion sensor built into the camera and used to trigger the thermal camera 430 to capture one or more thermal images when motion is detected. The thermal camera 430 may have a "normally open" or "normally closed" digital input that can trigger capture of one or more thermal images when external sensors (e.g., the sensors 420, PIR, door/window, etc.) detect motion or other events. In some implementations, the thermal camera 430 receives a command to capture an image when external devices detect motion or another potential alarm event. The thermal camera 430 may receive the command from the controller 412 or directly from one of the sensors 420.

In some examples, the thermal camera 430 triggers integrated or external illuminators (e.g., Infra-Red or other lights controlled by the property automation controls 422, etc.) to improve image quality. An integrated or separate light sensor may be used to determine if illumination is desired and may result in increased image quality.

The thermal camera 430 may be programmed with any combination of time/day schedules, monitoring system status (e.g., "armed stay," "armed away," "unarmed"), or other variables to determine whether images should be captured or not when triggers occur. The thermal camera 430 may enter a low-power mode when not capturing images. In this case, the thermal camera 430 may wake periodically to check for inbound messages from the controller 412. The thermal camera 430 may be powered by internal, replaceable batteries if located remotely from the control unit 410. The thermal camera 430 may employ a small solar cell to recharge the battery when light is available. Alternatively, the thermal camera 430 may be powered by the controller's 412 power supply if the thermal camera 430 is co-located with the controller 412.

In some implementations, the thermal camera 430 communicates directly with the monitoring server 460 over the Internet. In these implementations, thermal image data captured by the thermal camera 430 does not pass through the control unit 410 and the thermal camera 430 receives commands related to operation from the monitoring server 460.

In some implementations, the system 400 includes one or more visible light cameras, which can operate similarly to the thermal camera 430, but detect light energy in the visible wavelength spectral bands. The one or more visible light cameras can perform various operations and functions within the property monitoring system 400. For example, the visible light cameras can capture images of one or more areas of the property, which the cameras, the control unit, and/or another computer system of the monitoring system 400 can process and analyze.

The system 400 also includes one or more property automation controls 422 that communicate with the control unit to perform monitoring. The property automation controls 422 are connected to one or more devices connected to the system 400 and enable automation of actions at the property. For instance, the property automation controls 422 may be connected to one or more lighting systems and may be configured to control operation of the one or more lighting systems. Also, the property automation controls 422 may be connected to one or more electronic locks at the property and may be configured to control operation of the one or more electronic locks (e.g., control Z-Wave locks using wireless communications in the Z-Wave protocol). Further, the property automation controls 422 may be connected to one or more appliances at the property and may be configured to control operation of the one or more appliances. The property automation controls 422 may include multiple modules that are each specific to the type of device being controlled in an automated manner. The property automation controls 422 may control the one or more devices based on commands received from the control unit 410. For instance, the property automation controls 422 may interrupt power delivery to a particular outlet of the property or induce movement of a smart window shade of the property.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at the property and/or environmental data at the home, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more property automation controls 422.

In some implementations, a module 437 is connected to one or more components of an HVAC system associated with the property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robot that are capable of moving and taking actions that assist in home monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan of a building on the property and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, one or more of the thermal cameras 430 may be mounted on one or more of the robotic devices 490.

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 can be associated with one or more charging stations. The charging stations may be located at predefined home base or reference locations at the property. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact-based charging stations and/or wireless charging stations. For contact-based charging stations, the robotic devices 490 may have readily accessible points of contact that the robotic devices 490 are capable of positioning and mating with a corresponding contact on the charging station. For instance, a helicopter type robotic device 490 may have an electronic contact on a portion of its landing gear that rests on and mates with an electronic pad of a charging station when the helicopter type robotic device 490 lands on the charging station. The electronic contact on the robotic device 490 may include a cover that opens to expose the electronic contact when the robotic device 490 is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device 490 may always use a first charging station and a second robotic device 490 may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device 490 to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the property automation controls 422, the thermal camera 430, the thermostat 434, and the integrated security devices 480 may communicate with the controller 412 over communication links 424, 426, 428, 432, and 484. The communication links 424, 426, 428, 432, and 484 may be a wired or wireless data pathway configured to transmit signals from the sensors 420, the property automation controls 422, the thermal camera 430, the thermostat 434, and the integrated security devices 480 to the controller 412. The sensors 420, the property automation controls 422, the thermal camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, and 484 may include a local network. The sensors 420, the property automation controls 422, the thermal camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 4 (CAT5) or Category 6 (CAT6) wired Ethernet network. The local network may be a mesh network constructed based on the devices connected to the mesh network.

The monitoring server 460 is one or more electronic devices configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor data, thermal image data, and other monitoring system data received from the monitoring system and perform analysis of the sensor data, thermal image data, and other monitoring system data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, thermal image, and other data to determine an activity pattern of a resident of the property monitored by the system 400. In some implementations, the monitoring server 460 may analyze the data for alarm conditions or may determine and perform actions at the property by issuing commands to one or more of the automation controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the thermal camera 430 and/or reports related to the monitoring system. Although FIG. 4 illustrates two user devices for brevity, actual implementations may include more (and, perhaps, many more) or fewer user devices.

The smart home application 442 and the smart home user interface 452 can allow a user to interface with the property monitoring system 400, for example, allowing the user to view monitoring system settings, adjust monitoring system parameters, customize monitoring system rules, and receive and view monitoring system messages.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors 420 and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system 400.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the property automation controls 422, the thermal camera 430, and the robotic devices 490. The one or more user devices 440 and 450 receive data directly from the sensors 420, the property automation controls 422, the thermal camera 430, and the robotic devices 490 (i.e., the monitoring system components) and sends data directly to the monitoring system components. The one or more user devices 440, 450 provide the appropriate interfaces/processing to provide visual surveillance and reporting.

In other implementations, the system 400 further includes network 405 and the sensors 420, the property automation controls 422, the thermal camera 430, the thermostat 434, and the robotic devices 49 are configured to communicate sensor and image data to the one or more user devices 440 and 450 over network 405 (e.g., the Internet, cellular network, etc.). In yet another implementation, the sensors 420, the property automation controls 422, the thermal camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the property automation controls 422, the thermal camera 430, the thermostat 434, and the robotic devices 490 to a pathway over network 405 when the one or more user devices 440 and 450 are farther from the sensors 420, the property automation controls 422, the thermal camera 430, the thermostat 434, and the robotic devices 490. In some examples, the system leverages GPS information from the one or more user devices 440 and 450 to determine whether the one or more user devices 440 and 450 are close enough to the monitoring system components to use the direct local pathway or whether the one or more user devices 440 and 450 are far enough from the monitoring system components that the pathway over network 405 is required. In other examples, the system leverages status communications (e.g., pinging) between the one or more user devices 440 and 450 and the sensors 420, the property automation controls 422, the thermal camera 430, the thermostat 434, and the robotic devices 490 to determine whether communication using the direct local pathway is possible. If communication using the direct local pathway is possible, the one or more user devices 440 and 450 communicate with the sensors 420, the property automation controls 422, the thermal camera 430, the thermostat 434, and the robotic devices 490 using the direct local pathway. If communication using the direct local pathway is not possible, the one or more user devices 440 and 450 communicate with the monitoring system components using the pathway over network 405.

In some implementations, the system 400 provides end users with access to thermal images captured by the thermal camera 430 to aid in decision making. The system 400 may transmit the thermal images captured by the thermal camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 430 or other cameras of the system 400). In these implementations, the thermal camera 430 may be set to capture thermal images on a periodic basis when the alarm system is armed in an "armed away" state, but set not to capture images when the alarm system is armed in an "armed stay" or "unarmed" state. In addition, the thermal camera 430 may be triggered to begin capturing thermal images when the alarm system detects an event, such as an alarm event, a door-opening event for a door that leads to an area within a field of view of the thermal camera 430, or motion in the area within the field of view of the thermal camera 430. In other implementations, the thermal camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   receiving a request to deploy an aerial drone to assist an emergency vehicle from a first location to a second location;
   determining a route to be traversed by the emergency vehicle from the first location to the second location based on the request;
   causing transmission of one or more signals configured to change a state of a traffic signal at an intersection along the route;
   deploying the aerial drone to traverse at least a first portion of the route to the intersection along the route in advance of the emergency vehicle;
   determining that the state of the traffic signal is the same after as it was prior to the transmission of the one or more signals configured to change the state of the traffic signal; and
   deploying the aerial drone as a drone traffic signal, wherein the aerial drone is configured with one or more indicators for signaling one or more vehicles to stop.

2. The method of claim 1, wherein the one or more signals include one or more of: an infrared communication signal, an acoustic communication signal, or an electromagnetic signal.

3. The method of claim 1, wherein determining that the state of the traffic signal is the same after and prior to the one or more signals configured to change the state of the traffic signal was transmitted comprises:
   receiving sensor data from the aerial drone; and
   determining that the state of the traffic signal is the same after and prior to the one or more signals configured to change the state of the traffic signal was transmitted, based on processing the sensor data from the aerial drone.

4. The method of claim 1, wherein the one or more indicators include one or more of a colored light and a version of a road sign.

5. The method of claim 1, wherein deploying the aerial drone to traverse the route in advance of the emergency vehicle comprises:
   deploying the aerial drone to arrive at a third location along the route before the emergency vehicle.

6. The method of claim 1, comprising:
   receiving sensor data from the aerial drone; and
   based on processing the sensor data, determining that an intersection along the route is free from obstacles.

7. The method of claim 6, comprising:
   sending a signal to the emergency vehicle indicating that the intersection is free from obstacles.

8. The method of claim 1, further comprising:
   identifying the intersection along the route as an intersection with no functioning traffic signal.

9. The method of claim 1, comprising:
   deploying the aerial drone to the second location to aid in an emergency.

10. The method of claim 9, wherein aiding in the emergency comprises:
    illuminating a fire hydrant.

11. The method of claim 1, wherein causing transmission of the one or more signals configured to change a state of the traffic signal comprises:
    triggering the aerial drone to transmit the one or more signals configured to change a state of the traffic signal.

12. The method of claim 1, comprising:
    identifying a starting point of the route, a destination point along the route, and the traffic signal of the intersection along the route between the starting point and the destination point.

13. A system comprising one or more computers and one or more storage devices on which are stored instructions that are operable, when executed by the one or more computers, to cause the one or more computers to perform operations comprising:
    receiving a request to deploy an aerial drone to assist an emergency vehicle from a first location to a second location;
    determining a route to be traversed by the emergency vehicle from the first location to the second location based on the request;
    causing transmission of one or more signals configured to change a state of a traffic signal at an intersection along the route;
    deploying the aerial drone to traverse at least a first portion of the route to the intersection along the route in advance of the emergency vehicle;
    determining that the state of the traffic signal is the same after as it was prior to the transmission of the one or more signals configured to change the state of the traffic signal; and
    deploying the aerial drone as a drone traffic signal, wherein the aerial drone is configured with one or more indicators for signaling one or more vehicles to stop.

14. The system of claim 13, wherein the one or more signals include one or more of: an infrared communication signal, an acoustic communication signal, or an electromagnetic signal.

15. The system of claim 13, wherein causing transmission of the one or more signals configured to change a state of the traffic signal comprises:
    triggering the aerial drone to transmit the one or more signals configured to change a state of the traffic signal.

16. The system of claim 13, wherein the operations comprise:
    identifying a starting point of the route, a destination point along the route, and the traffic signal of the intersection along the route between the starting point and the destination point.

17. The system of claim 13, wherein determining that the state of the traffic signal is the same after and prior to the one or more signals configured to change the state of the traffic signal was transmitted comprises:

receiving sensor data from the aerial drone; and determining that the state of the traffic signal is the same after and prior to the one or more signals configured to change the state of the traffic signal was transmitted, based on processing the sensor data from the aerial drone.

18. A non-transitory computer storage medium encoded with instructions that, when executed by one or more computers, cause the one or more computers to perform operations comprising:

receiving a request to deploy an aerial drone to assist an emergency vehicle from a first location to a second location;

determining a route to be traversed by the emergency vehicle from the first location to the second location based on the request;

causing transmission of one or more signals configured to change a state of a traffic signal at an intersection along the route;

deploying the aerial drone to traverse at least a first portion of the route to the intersection along the route in advance of the emergency vehicle;

determining that the state of the traffic signal is the same after as it was prior to the transmission of the one or more signals configured to change the state of the traffic signal; and deploying the aerial drone as a drone traffic signal, wherein the aerial drone is configured with one or more indicators for signaling one or more vehicles to stop.

19. The medium of claim 18, wherein causing transmission of the one or more signals configured to change a state of the traffic signal comprises:

triggering the aerial drone to transmit the one or more signals configured to change a state of the traffic signal.

20. The medium of claim 18, wherein the operations comprise:

identifying a starting point of the route, a destination point along the route, and the traffic signal of the intersection along the route between the starting point and the destination point.

\* \* \* \* \*